M. M. FITZGERRELL.
GRAIN-DRILL.
No. 190,480. Patented May 8, 1877.
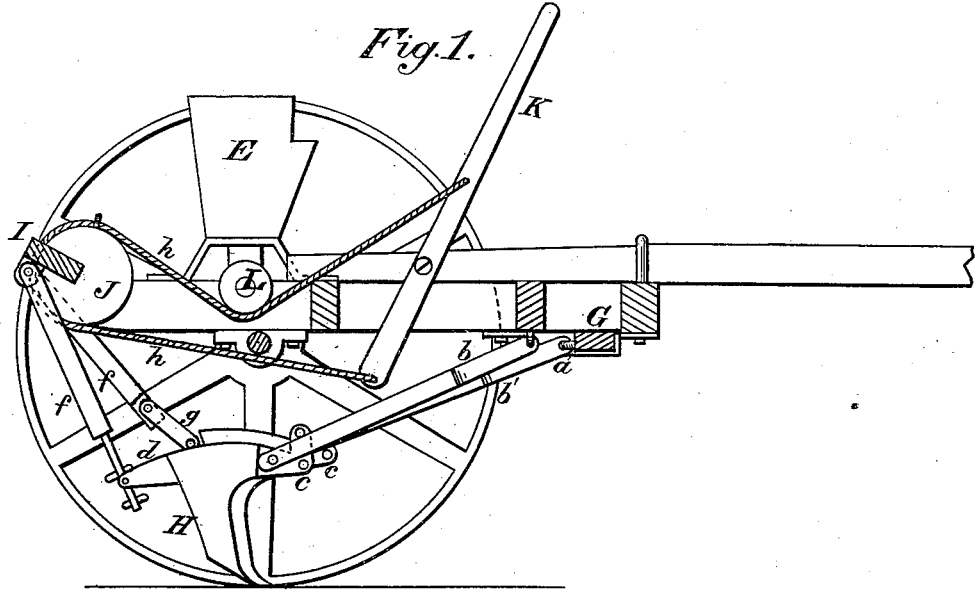
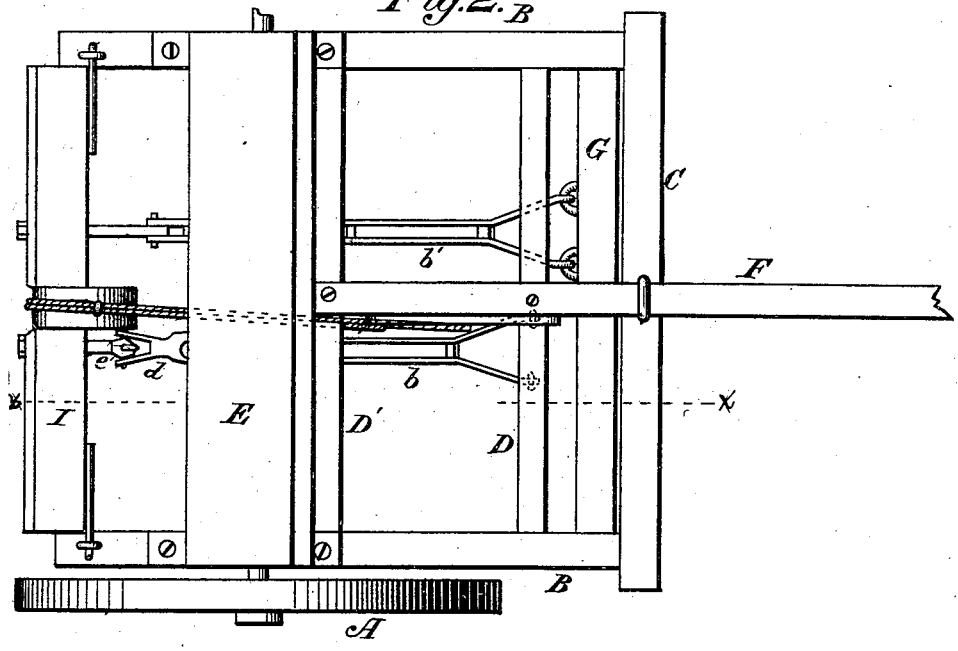
Attest:
F. H. Schott
A. R. Brown
Inventor:
Monroe M. Fitzgerrell,
Per, Judson & King,
Attorneys.

UNITED STATES PATENT OFFICE.

MONROE M. FITZGERRELL, OF BALD HILL TOWNSHIP, JEFFERSON COUNTY, ILLINOIS.

IMPROVEMENT IN GRAIN-DRILLS.

Specification forming part of Letters Patent No. 190,480, dated May 8, 1877; application filed November 29, 1876.

*To all whom it may concern:*

Be it known that I, MONROE M. FITZGERRELL, of Bald Hill township, in the county of Jefferson and State of Illinois, have invented certain new and useful Improvements in Grain-Drills; and I do hereby declare that the following is a full, clear, and exact description thereof, reference being had to the accompanying drawings, and to the letters of reference marked thereon, which form a part of this specification.

This invention has for its object to furnish a simple, convenient, and reliable machine for planting corn, cotton, and other seeds, and which, through its peculiar construction, affords great facilities for the adjustment of the drill-plows by the operator; and the invention consists in the construction, arrangement, and combination of the several parts of the machine, as will be hereinafter fully described, and then specifically pointed out in the claim.

In the annexed drawing, Figure 1 is a longitudinal section taken on the line $x\ x$ of Fig. 2, the latter being a plan view.

The machine is carried upon a pair of wheels, A, and consists of a rectangular frame, composed of two side pieces, B, and end piece C, and is further provided with the stationary girts D and D', in the rear of which, and immediately over the axle, is the seed-box E. The frame is also provided with a tongue, F, by which it is guided when in operation. Moving in slides $a$, beneath the front part of the frame, is an adjustable cross-bar, G, to which the bifurcated draft-bar $b$ is attached, while a modification is shown in the bar $b'$, which is secured to the girt D, both being attached by staples which allow them to move freely.

To the opposite ends of the draft-bars $b$ and $b'$ is journaled, through the agency of the projections $c$, the tubular drill-plows H. These projections $c$ are provided with two pins, one of which passes through below the bifurcated draft-bars, and the other above them. Thus, when the pins are both in place, the plow is held rigidly to the bar; but when one or both of them is removed it hangs and moves freely upon the pivot-pin passing through the end of the draft-bars. To the rear of the drill-plows H is secured another projection, $d$, the outer end of which is bifurcated, and incloses a ring, $e$, which is suspended by trunnions journaled in the forked arms of the projection $d$. Through this ring $e$ passes one end of the lifting-bar $f$, through which two pins are passed, at such a distance from each other as to allow a prescribed amount of vertical movement to the plow.

A modification of this device consists in pivoting to the lower end of the lifting-bar an elbow-link, $g$, which is, in turn, pivoted at the elbow to the rear projection of the plow. This will allow the plow to rise until its back side comes in contact with the link, and to fall until the upper part of the link is in line with the bar $f$. These lifting-bars $f$, at their upper ends, are pivoted to the back side of the rock-shaft I, journaled in line with its front side, in the rear ends of the side pieces B. This shaft has secured upon it, near the middle of its length, a pulley, J, attached to which, and passing entirely around it, is the rope or chain $h$, the lower part passing directly to, and being fastened to the lower end of, a hand-lever, K, which is pivoted to the tongue F. In front of the seed-box, to the lever, an equal distance above the pivot to that of the point of attachment of the lower end of the chain or rope, is secured the upper end of the same, it being prevented from chafing against the seed-box by the pulley L, secured by a bracket to its lower side.

The hand-lever being placed within a convenient distance of the driver, it is evident that, upon pushing it from him, the drill-plows will, through the agency of the devices heretofore described, be raised from the ground, and that a reverse movement of it will allow them to drop until they enter the earth to the depth required, while the method of attaching the lifting-bars to the plows allows the latter to rise on striking a stone or other obstruction, and regain their proper position and depth in the earth after passing it.

Having thus described my invention, I claim as new, and desire to secure by Letters Patent of the United States, the following:

The tubular drill-plows H, provided with forked projections $d$, in combination with pivoted rings $e$, lifting-bars $f$, rock-shaft I, and its operating devices, substantially as and for the purpose specified.

In testimony whereof I have hereunto affixed my signature this 21st day of November, 1876, in presence of two witnesses.

MONROE M. FITZGERRELL.

Witnesses:
MARTHA A. LUSK,
ANDREW J. FITZGERRELL.